(12) United States Patent
Edwards

(10) Patent No.: US 6,886,746 B1
(45) Date of Patent: May 3, 2005

(54) METHOD AND APPARATUS FOR SEPARATING NOISE FROM A WEIGHT SIGNAL OF A SELF-SERVICE CHECKOUT TERMINAL

(75) Inventor: Tom Edwards, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 205 days.

(21) Appl. No.: 10/328,341

(22) Filed: Dec. 23, 2002

(51) Int. Cl.⁷ .............................................. G06K 15/00
(52) U.S. Cl. ...................................................... 235/383
(58) Field of Search ................................ 235/383, 385, 235/381, 380; 177/145, 25.13, 1, 136, 133

(56) References Cited

U.S. PATENT DOCUMENTS

| | | | |
|---|---|---|---|
| 4,347,903 A | 9/1982 | Yano et al. | |
| 4,412,298 A | 10/1983 | Feinland et al. | |
| 4,660,160 A | 4/1987 | Tajima et al. | |
| 4,715,457 A | 12/1987 | Amacher et al. | |
| 4,779,706 A | 10/1988 | Mergenthaler | |
| 4,787,467 A | 11/1988 | Johnson | |
| 4,792,018 A | 12/1988 | Humble et al. | |
| 5,123,494 A | 6/1992 | Schneider | |
| 5,125,465 A | 6/1992 | Schneider | |
| 5,230,391 A | 7/1993 | Murata et al. | |
| 5,300,736 A * | 4/1994 | Ehrhardt | 177/145 |
| 5,488,202 A | 1/1996 | Baitz et al. | |
| 5,952,642 A | 9/1999 | Lutz | |
| 5,967,264 A | 10/1999 | Lutz et al. | |
| 6,080,938 A | 6/2000 | Lutz | |
| 6,433,288 B1 * | 8/2002 | Olafsson | 177/145 |
| 6,580,038 B1 * | 6/2003 | Mooney | 177/145 |

* cited by examiner

Primary Examiner—Thien M. Le
(74) Attorney, Agent, or Firm—Maginot, Moore & Beck LLP; Paul W. Martin

(57) ABSTRACT

A retail terminal and/or a method of operating a retail terminal having a first weight scale associated therewith includes the step of weighing an item by using the first weight scale. The method also includes the step of producing a first output signal dependent upon the weighing step. The first output signal includes a first weight signal and a first noise signal. Moreover, the method includes the step of estimating the first noise signal to produce an estimated first noise signal. Yet further, the method includes the step of subtracting the estimated first noise signal from the first output signal. A retail checkout terminal is also disclosed.

31 Claims, 10 Drawing Sheets

METHOD AND APPARATUS FOR SEPARATING NOISE FROM A WEIGHT SIGNAL OF A SELF-SERVICE CHECKOUT TERMINAL

TECHNICAL FIELD OF THE INVENTION

The present invention relates generally to a retail checkout terminal, and more particularly to a method and apparatus for determining a stable weight measurement for use in a security software application of a self-service checkout terminal.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area which is staffed by a store employee. Thus, a self-service checkout terminal permits a customer to select, itemize, and in some cases pay for his or her purchase without the assistance of the retailer's personnel.

A customer typically has little or no training in the operation of a self-service checkout terminal prior to his or her initial use of the checkout terminal. One concern that retailers have when evaluating a self-service checkout terminal is the level of supervision provided to inexperienced customers. Moreover, it is also known that some customers may have improper intentions when using a self-service checkout terminal. In traditional checkout systems, the clerk employed by the retailer to operate the checkout terminal provides a level of security against theft or other improprieties. However, in the case of a self-service checkout terminal, the terminal itself must provide the necessary security. Such security includes preventing a customer from either inadvertently or intentionally placing an item in a grocery container such as a grocery bag without scanning the item, or voiding one item from entry, but removing a second item of lesser value, or no item at all, from the grocery bag. Thus, another concern when evaluating a self-service checkout terminal is the level of security provided against illicit use of the self-service checkout terminal by customers.

Therefore, self-service checkout terminals have heretofore been designed with security systems which monitor operation of the self-service checkout terminal. For example, weight scales have been incorporated into self-service checkout terminals to monitor the manner in which a customer handles or otherwise processes items during operation of the self-service checkout terminal. In particular, self-service checkout terminals have heretofore been designed with a weight scale positioned so as to detect placement of items in or removal of items from a bagging area associated with the self-service checkout terminal (including a number of shelves around the bagging area).

In such security systems, a security software application is executed by a processing unit associated with the self-service checkout terminal in order to analyze or otherwise process output from the weight scale and the other terminal components of the security system. It is imperative that the security software application is provided with timely, accurate, stable weight values from the weight scale in order to properly determine when a security breach has occurred. Weight scales which are commonly used in retail applications are relatively sensitive to weight changes, and therefore can sometimes generate output signals indicative of weight changes when in fact no items have been placed in or removed from the bagging area. In particular, most modern, commercially available retail weight scales include a controller which can calculate and thereafter output weight values in a relatively short period of time (e.g. typically measured in milliseconds). Such fast weight value generation may undesirably produce "false alarms" if reported directly to the security software application of the self-service checkout terminal. In particular, many environmental conditions and sources of environmental vibration present in a retail store may lead to an increase or decrease in the measured weight value of the items in the bagging area without an item actually being placed in or removed from the bagging area. That is, the environmental vibration introduces noise into the signals representing the measured weight values. For example, if a customer bumps into the self-service checkout terminal, the weight scale may actually register a weight change which could cause the security software application to falsely conclude that a security breach has occurred. Moreover, it is known that the cycling of the retail store's air conditioning system can cause changes in the measured weight of the items in the bagging area if the self-service checkout terminal is positioned in a certain location relative to outlets associated with the air conditioning system. Further, environmental vibrations can be a problem when the supporting floor is not rigid enough to prevent bounce of the equipment.

The environmental vibration results in decreased precision or longer settling times for the bag scale system. As a result, the system may not correctly recognize the weight of the item on the scale, causing the system to falsely trigger a security alarm. In the extreme case, the system becomes unusable because the weight detected by the scale appears to continuously drift, thereby making it impossible for the system to measure actual weight.

What is needed therefore is an apparatus and method for operating a self-service checkout terminal which overcomes one or more of the above-mentioned drawbacks. What is particularly needed is a method and apparatus which provides timely, accurate, and stable weight measurements for use by a security software application associated with a self-service checkout terminal.

SUMMARY OF THE INVENTION

In accordance with a first embodiment of the present invention, there is provided a method of operating a retail terminal having a first weight scale associated therewith. The method includes the step of using the first weight scale to produce a first output signal. The first output signal includes a first weight signal and a first noise signal. The method also includes the step of removing the first noise signal from the first output signal.

In accordance with a second embodiment of the present invention, there is provided a retail terminal. The retail terminal includes a first weight scale. The retail terminal also includes a vibration-measuring device. Moreover, the retail terminal includes a processing unit electrically coupled to each of the first weight scale and the vibration-measuring device. The processing unit is configured for (a) receiving a first output signal from the first weight scale, (b) receiving a noise signal from the vibration-measuring device, and (c) modifying the first output signal dependent upon the noise signal.

In accordance with a third embodiment of the present invention, there is provided a method of operating a retail terminal having a first weight scale associated therewith. The method includes the step of weighing an item by using the first weight scale. The method also includes the step of producing a first output signal dependent upon the weighing step. The first output signal includes a first weight signal and a first noise signal. Moreover, the method includes the step of estimating the first noise signal to produce an estimated first noise signal. Yet further, the method includes the step of subtracting the estimated first noise signal from the first output signal.

In accordance with a fourth embodiment of the present invention, there is provided a method of operating a retail terminal having a plurality of weight-measuring scales associated therewith. The method includes the step of using the weight-measuring scales to produce a plurality of respective first output signals. Each first output signal includes a respective first weight signal and a respective first noise signal. The method also includes the step of providing the retail terminal with a reference weight scale. Moreover, the method includes the step of using the reference weight scale to produce a second output signal. The second output signal includes a second weight signal and a second noise signal. Yet further, the method includes the step of removing each first noise signal from each first output signal. The removing step is dependent upon the second noise signal.

It is therefore an object of the present invention to provide a new and useful method and apparatus of operating a retail checkout terminal.

It is moreover an object of the present invention to provide an improved method and apparatus for operating a retail checkout terminal.

It is yet further an object of the present invention to provide a method and apparatus for operating a retail checkout terminal which provides stable weight measurements for use by a security software application associated with the retail checkout terminal.

It is still further an object of the present invention to provide a method and apparatus for applying noise cancellation techniques to a retail checkout terminal in order to compensate for unintended environmental vibrations.

The above and other objects, features, and advantages of the present invention will become apparent from the following description and the attached drawings.

DETAILED DESCRIPTION OF THE INVENTION

Figure 1:
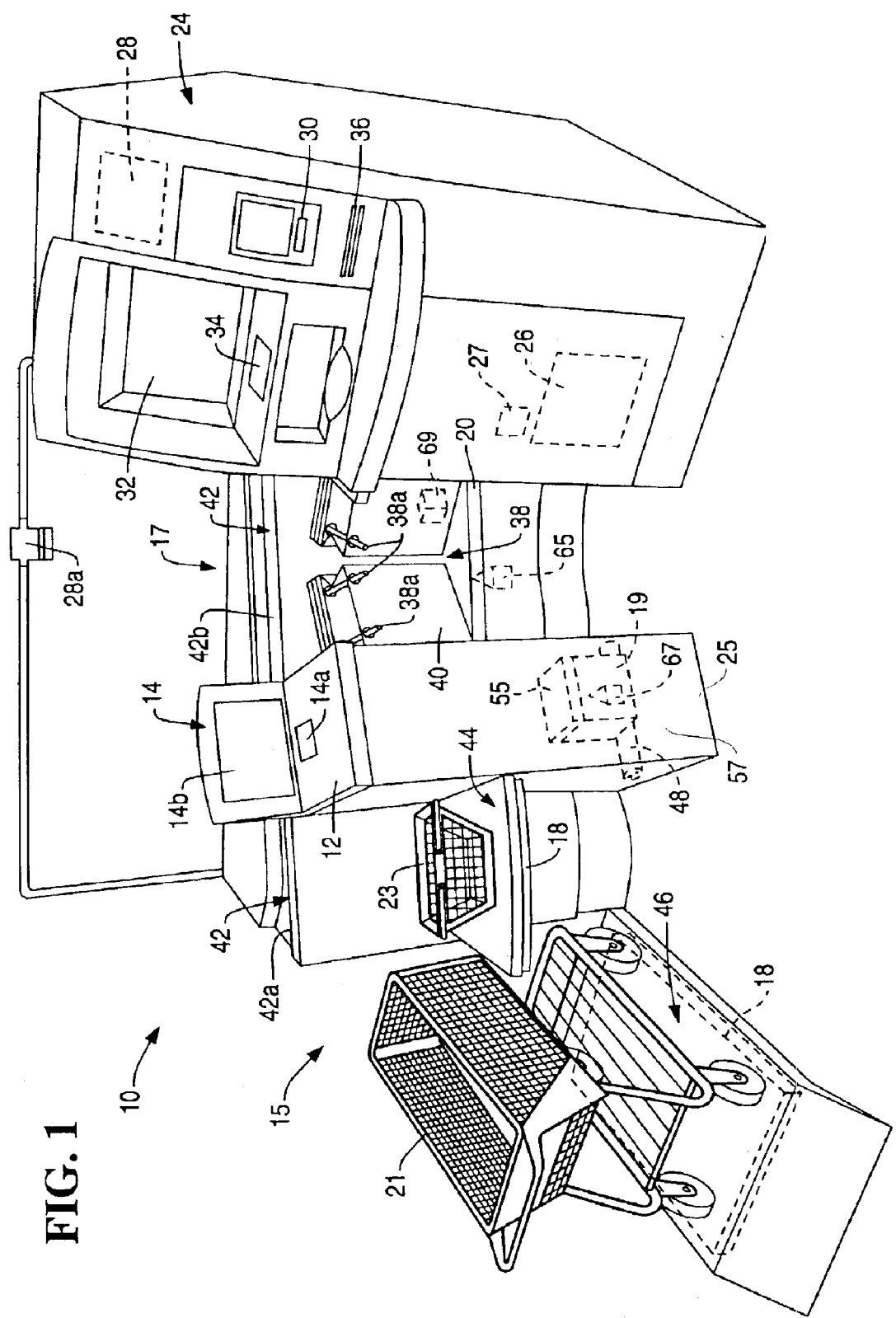
FIG. 1 is a perspective view of an exemplary self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
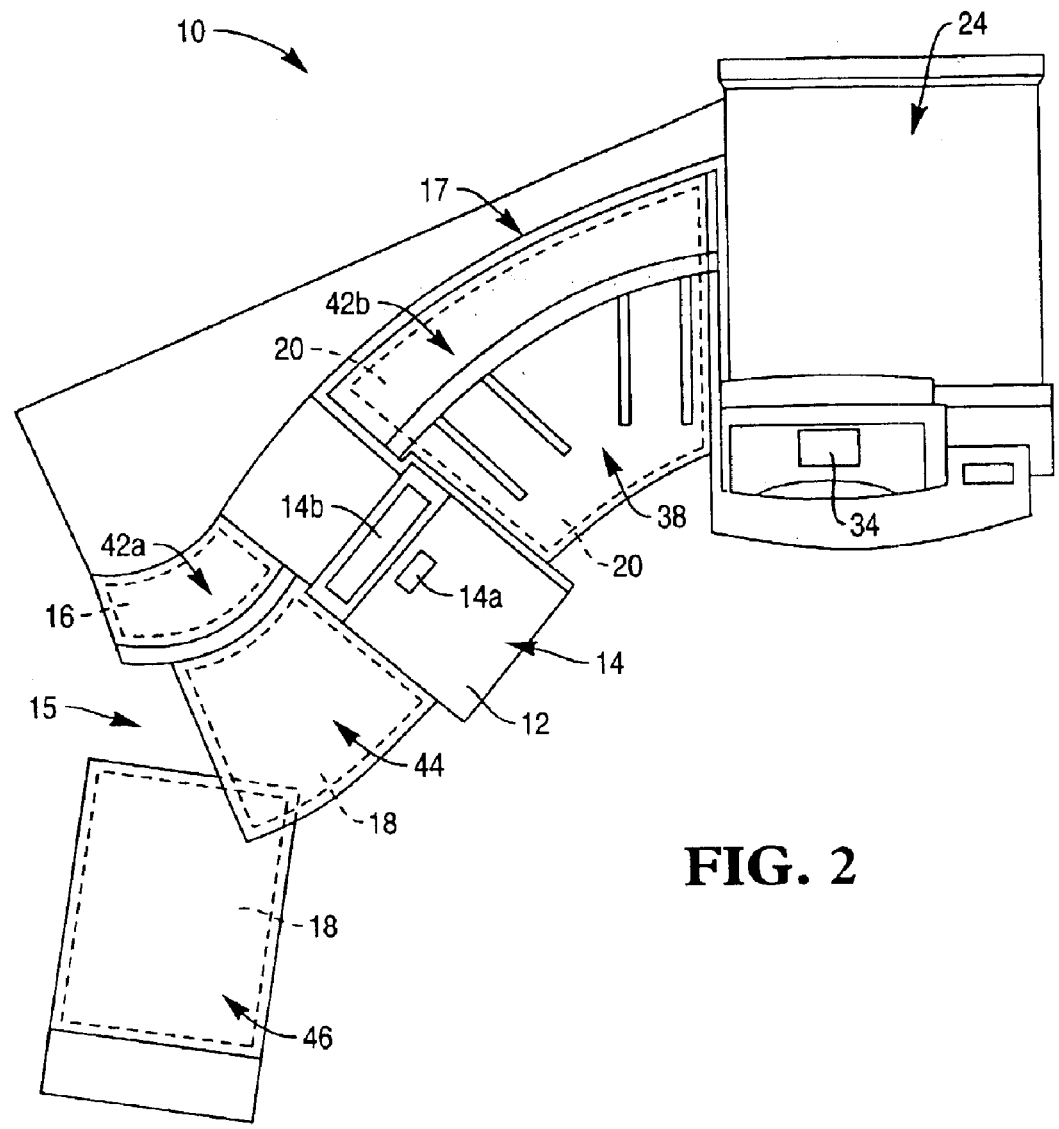
FIG. 2 is a top plan view of the self-service checkout terminal of FIG. 1.

Referring now to FIGS. 1 and 2, there is shown an exemplary self-service retail checkout terminal 10 for use in a retail business such as a grocery store. For purposes of the following discussion, the self-service checkout terminal 10 will be described in detail; however, it should be appreciated that an assisted checkout terminal (i.e. a retail checkout terminal which is operated by a store employee such as a checkout clerk) may be configured and/or utilized in a similar manner. The self-service checkout terminal 10 includes a product scale 12, a scanner 14, a post-scan or bagging scale 20, a reference scale 19, an equipment cabinet 25, an automated teller machine (ATM) 24, and a processing unit 26. The ATM 24 includes a video system 28, a card reader 30, a display monitor 32, a data input device 34, and a printer 36. As shall be discussed below in more detail, the self-service checkout terminal 10 may alternatively also be equipped with a pre-scan shelf scale 16 and a cart/basket scale 18.

Each of the scales 12, 16, 18, 19 and 20 includes at least one weight detector embodied as a pressure sensor, such as a load cell sensor, which senses pressure in the form of weight and issues a signal in response thereto. For example, the weight of an item 69 placed on the post-scan scale 20 exerts pressure on the load cell 65 of the post-scan scale 20, thereby causing the scale 20 to issue a voltage signal which varies with the weight of the item. The voltage signal can vary linearly with the weight of the item. The load cell sensors translate pressure to an electrical analog. At least one signal derived from the load cells is fed in digital form to program instructions within the processing unit 26 for processing. The program instructions may be in the form of software or firmware, for example.

The outputs of the scales 12, 16, 18, 19 and 20 each include a component (W(t)) reflecting the weight of the object(s) being weighed, and a component (N(t)) reflecting the effects of environmental disturbances or vibrations, otherwise known as noise. The scales 12, 16, 18, 19 and 20 respond both to the environmental noise N(t) and the intended item weight W(t), outputting the sum of these signal components as W(t)+N(t). The present invention removes the noise component N(t) from the scale output W(t)+N(t), thereby eliminating the noise introduced by the environment and leaving only the desired signal W(t). For example, the noise component N(t) can be subtracted from the scale output W(t)+N(t).

The self-service checkout terminal 10 also includes a bagwell 38 for accommodating one or more grocery containers or bags 40, a counter 42, and a basket shelf 44. The counter 42 defines an arcuate surface as shown in FIG. 2. Such an arcuate surface allows the counter 42 to be positioned relatively close to both the scanner 14 and the bagwell 38 thereby permitting the counter 42 to function as a "set-aside surface" for use by the user during operation of the self-service checkout terminal 10. Such set-aside surfaces are necessary to allow the user to selectively choose the order in which items are scanned or otherwise entered. Moreover, such set-aside surfaces are necessary to allow a user to selectively choose the order in which items are loaded into the grocery bags 40. For example, if the user scanned a loaf of bread, the user may wait to load the bread into the grocery bag 40 until the bag is nearly full thereby preventing the bread from being crushed. As alluded to above, it may be desirable to use the set-aside surfaces both before and after an item has been scanned or otherwise entered. Hence, as shown in FIG. 2, the scanner 14 divides the counter 42 into a pre-scan set-aside shelf 42a, and a post-scan set-aside shelf 42b. In particular, the scanner 14 divides the counter 42 into the pre-scan set-aside shelf 42a which is upstream of the scanner 14, and the post-scan set-aside shelf 42b which is downstream from the scanner 14. The terms "upstream" and "downstream" are used to be consistent with the flow of items through the self-service checkout terminal 10 during a typical checkout procedure. In particular, an item enters at the area proximate the pre-scan set-aside shelf 42a then flows in a downstream direction to be scanned at the scanner 14 so as to enter a product code associated with the item. Once the product code associated with the item is entered, the item flows from the scanner 14 in a downstream direction to the post-scan set-aside shelf 42b or the bagwell 38.

The bagwell 38 is disposed between the scanner 14 and the ATM 24 as shown in FIG. 1. The bagwell 38 includes a number of posts 38a which cooperate to support a number of the grocery bags 40. The bagwell 38 is configured to allow two or more grocery bags 40 to be accessed by the user at any given time. In particular, the posts 38a are of a sufficient length to secure a number of unopened grocery bags 40 along with two or more opened grocery bags 40 thereby allowing a user to selectively load various item types into the grocery bags 40. For example, the user may desire to use a first grocery bag 40 for household chemical items such as soap or bleach, and a second grocery bag 40 for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 1. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code is then converted into pricing information which is then used to determine the cost of the item in a known manner.

If utilized, the pre-scan shelf scale 16 is positioned in order to determine the weight of an item or items positioned on the pre-scan shelf 42a. In particular, if a user removes an item from the pre-scan shelf 42a in order to scan or otherwise enter the item into the self-service checkout terminal 10, the pre-scan shelf scale 16 may be used to determine the weight of the item by detecting a weight decrease associated with removal of the item from the pre-scan shelf 42a. Moreover, the pre-scan shelf 42a functions as a "return area" of the self-service checkout terminal 10. More specifically, if the user voids an item from entry during the checkout procedure, the user is instructed via a message displayed on the display monitor 32 to position the voided item on the pre-scan shelf 42a. Hence, the pre-scan shelf scale 16 may be used to determine the weight associated with the voided item by detecting a weight increase associated with placement of the voided item on the pre-scan shelf 42a.

Moreover, if utilized, the cart/basket scale 18 is positioned in order to determine the weight of an item or items positioned in either (1) a grocery cart 21 positioned on a cart unloading platform 46, and/or (2) a grocery hand basket 23 positioned on the basket shelf 44. In particular, if a user removes an item from either the grocery cart 21 or the grocery hand basket 23 in order to scan or otherwise enter the item into the self-service checkout terminal 10, the cart/basket scale 18 may be used to determine the weight of the item by detecting a weight decrease associated with removal of the item from either the grocery cart 21 or the grocery hand basket 23, respectively. It should be appreciated that the cart/basket scale 18 may be embodied as two separate scales (i.e. a first scale for detecting weight changes on the cart unloading platform 46, and second scale for detecting weight changes on the basket shelf 44), or may preferably be embodied as a single, integrated weight scale which is mechanically coupled to both the cart unloading platform 46 and the basket shelf 44.

From the above discussion, it should be appreciated that the pre-scan shelf scale 16 and the cart/basket scale 18 cooperate to monitor placement of items into, and removal of items from, a pre-scan area 15 associated with the self-service checkout terminal 10. What is meant herein by the term "pre-scan area" is the area associated with the self-service checkout terminal 10 in which items may be placed prior to being scanned or otherwise entered into the self-service checkout terminal 10. For example, the pre-scan area 15 includes the pre-scan shelf 42a, the cart unloading platform 46, and the basket shelf 44.

The post-scan scale 20 is positioned in order to determine the weight of an item or items positioned (1) on the post-scan shelf 42b, and/or (2) in the bagwell 38 (i.e. in one of the grocery bags 40). In particular, if a user places an item on the post-scan shelf 42b or into one of the grocery bags 40, the post-scan scale 20 may be used to determine the weight of the item by detecting a weight increase associated with placement of the item on the post-scan shelf 42b or into one of the grocery bags 40. Alternatively, if a user removes an item from the post-scan shelf 42b or one of the grocery bags 40, the post-scan scale 20 may be used to determine the weight of the item by detecting a weight decrease associated with removal of the item from the post-scan shelf 42b or one of the grocery bags 40. The post-scan scale may be embodied as any known retail weight scale. One such retail weight scale which is particularly useful as the post-scan scale 20 of the present invention is a model number 6680 weight scale which is commercially available from Weigh-Tronix, Incorporated of Santa Rosa, Calif.

From the above discussion, it should be appreciated that the post-scan scale 20 monitors placement of items into, and removal of items from, a post-scan area 17 associated with the self-service checkout terminal 10. What is meant herein by the term "post-scan area" is the area associated with the self-service checkout terminal 10 in which items may be placed subsequent to being scanned or otherwise entered into the self-service checkout terminal 10. For example, the post-scan area 17 includes the post-scan shelf 42b and the bagwell 38 (including the grocery bags 40 therein).

It should be further appreciated that the post-scan scale 20 may be used to monitor movement or shuffling of items within the post-scan area 17. In particular, the post-scan scale 20 may be used to monitor movement of items onto and off of a number of post-scan surfaces within the post-scan area 17. What is meant herein by the term "post-scan surface" is any surface within the post-scan area on which an item may be positioned after being scanned or otherwise entered into the self-surface checkout terminal 10. An example of a post-scan surface would include the post-scan shelf 42b and the base of the bagwell 38 on which the grocery bags 40 are positioned. Hence, the post-scan scale 20 may be used to monitor movement of items which had been previously set-aside on the post-scan shelf 42b and thereafter either placed into one of the grocery bags 40 or removed permanently from the self-service checkout terminal 10 (e.g. placed in the user's pocket). For instance, the post-scan scale 20 may be used to first determine that an item has been removed from the post-scan shelf 42b by detecting a weight decrease associated with removal of the item. Thereafter, the post-scan scale 20 may be used to determine if the item is then placed into one of the grocery bags 40 by detecting a weight increase associated with placement of the item into one of the grocery bags 40.

Each of the product scale 12, the pre-scan shelf scale 16, the cart/basket scale 18, the reference scale 19 and the post-scan scale 20 is preferably rigidly attached to and supported by the cabinet 25. More particularly, the reference scale 19 is rigidly attached to the cabinet 25 via a bracket 48. The reference scale 19 and the bracket 48 are both disposed within a cavity 57 of the cabinet 25. As alluded to above, each of the scales 12, 16, 18, 19, and 20 is naturally exposed to environmental vibrations, such as caused by, for example, a user bumping into or jarring the terminal 10, or by changes in the air circulation around the terminal 10. These vibrations are transmitted to each of the scales 12, 16, 18, 19, and 20 through the cabinet 25. Thus, the reference scale 19 is subject to the same environmental vibrations as are the scales 12, 16, 18 and 20.

The reference scale 19, which functions as a vibration-measuring device or noise-measuring device, includes a built-in mass 55 having a fixed, known weight. Because the load cell 67 of the reference scale 19 is subject to a constant pressure created by the permanently attached mass 55, the load cell would provide a constant output in the absence of vibration. In operation, the reference scale 19 constantly measures the weight of the mass 55 subject to the effects of the environmental vibrations transmitted through the cabinet 25. Thus, the weight of the mass 55 as measured by the reference scale 19 varies with time as the environmental conditions acting on the cabinet 25 also vary with time.

The processing unit 26 executes a security software application 22 (see FIG. 4) in order to provide security during operation of the self-service checkout terminal 10. In particular, the security software application 22 utilizes weight values generated by the post-scan scale 20 in order to determine if the movement of items within the post-scan area 17 represents a security breach. For example, the processing unit 26 utilizes the security software application 22 to determine if an item has been placed in the post-scan area 17 without having first been scanned or otherwise entered into the self-service checkout terminal 10. As a further example, the processing unit 26 utilizes the security software application 22 to determine if a user voids a first item and then removes a second, different item from the post-scan area 17. Yet further, the processing unit 26 utilizes the security software application 22 to track movement of items within the post-scan area 17 such as movement of items between the post-scan shelf 42b and the grocery bags 40.

Figure 4:
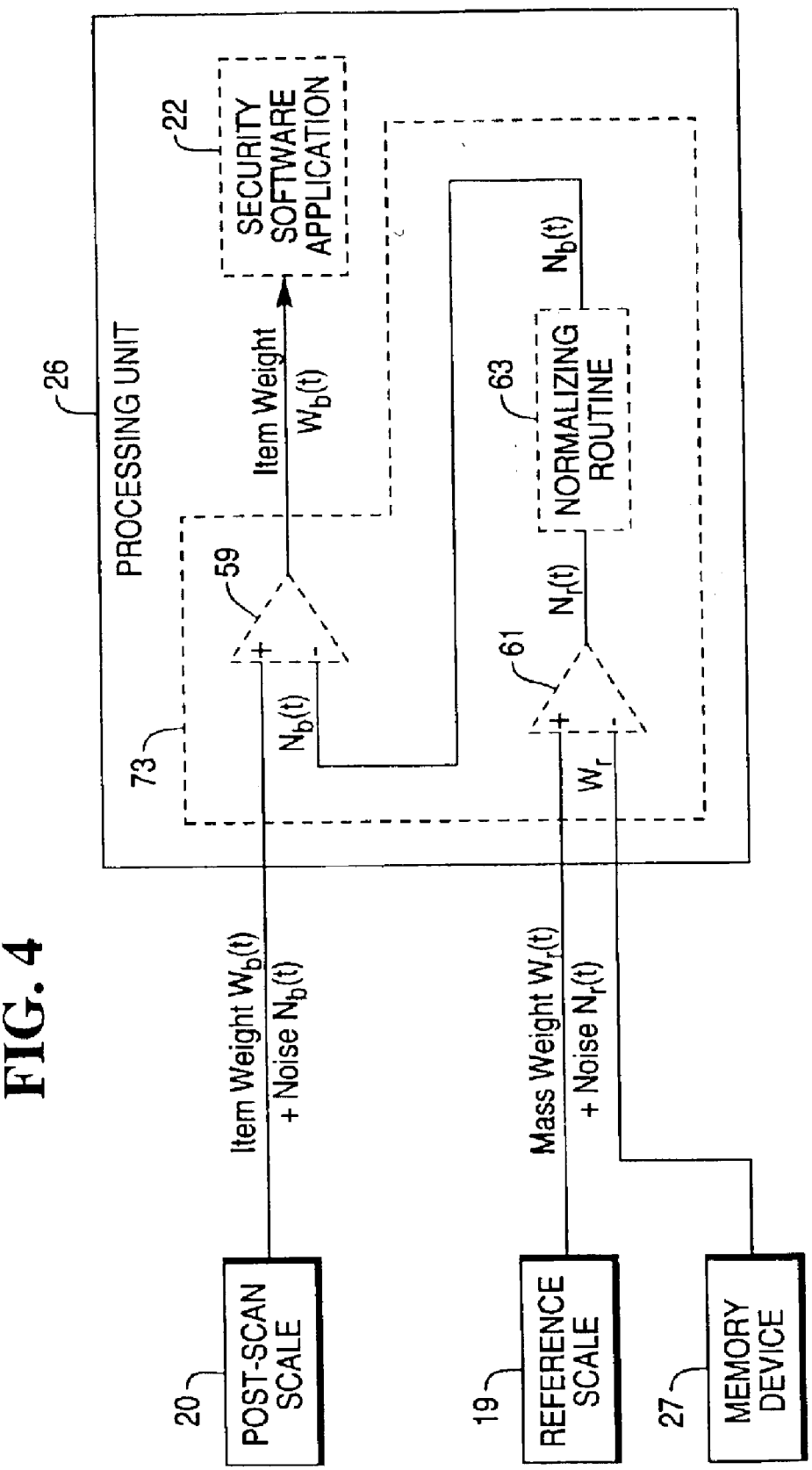
FIG. 4 is a simplified block diagram which shows a data path for generating valid, stable weights according to the present invention.

In order to provide valid, stable weights for use by the security software application 22, the processing unit 26 removes the noise from the output of the post-scan scale 20 prior to presentation thereof to the security software application 22. In particular, as shown in FIG. 4, the processing unit 26 executes a noise cancellation routine 73 which produces a valid, stable weight signal from the output signal generated by the post-scan scale 20 and thereafter outputs the valid, stable weight signal to the security software application 22. Such removal of the noise from the output signal of the post-scan scale 20 includes the subtraction of the noise signal component from the output signal. The noise signal is associated with variations in the weight measured by the post-scan scale 20 due to environmental conditions. For example, if a user bumps into the self-service checkout terminal 10, the post-scan scale 20 may actually detect or otherwise register a weight change which could cause the security software application 22 to falsely conclude that a security breach has occurred. However, the noise signal component associated with such a weight change is subtracted out of the output signal of the post-scan scale 20 by a difference circuit 59, which may be embodied in software, thereby preventing such an erroneous conclusion that a security breach has occurred. Moreover, cycling of the retail store's air conditioning system may cause the post-scan scale 20 to register measured weight values indicative of a weight change which could cause the security software application 22 to falsely conclude that a security breach has occurred. As with before, the noise signal component associated with such an erroneous weight change is subtracted out of the output signal of the post-scan scale 20 by the difference circuit 59. The process of removing the noise signal from the output signal of post-scan scale 20 will be discussed below in more detail in regard to FIG. 6.

The display monitor 32 displays instructions which serve to guide a user through a checkout procedure. For example, an instruction is displayed on the display monitor 32 which instructs the user to remove an item from the grocery cart 21 and enter the item into the self-service checkout terminal 10 by (1) passing the item over the scanner 14, or (2) placing the item on the product scale 12 in order to obtain the weight of the item. The display monitor 32 may be a known touch screen monitor which can generate data signals when certain areas of the screen are touched by a user.

Figure 3:
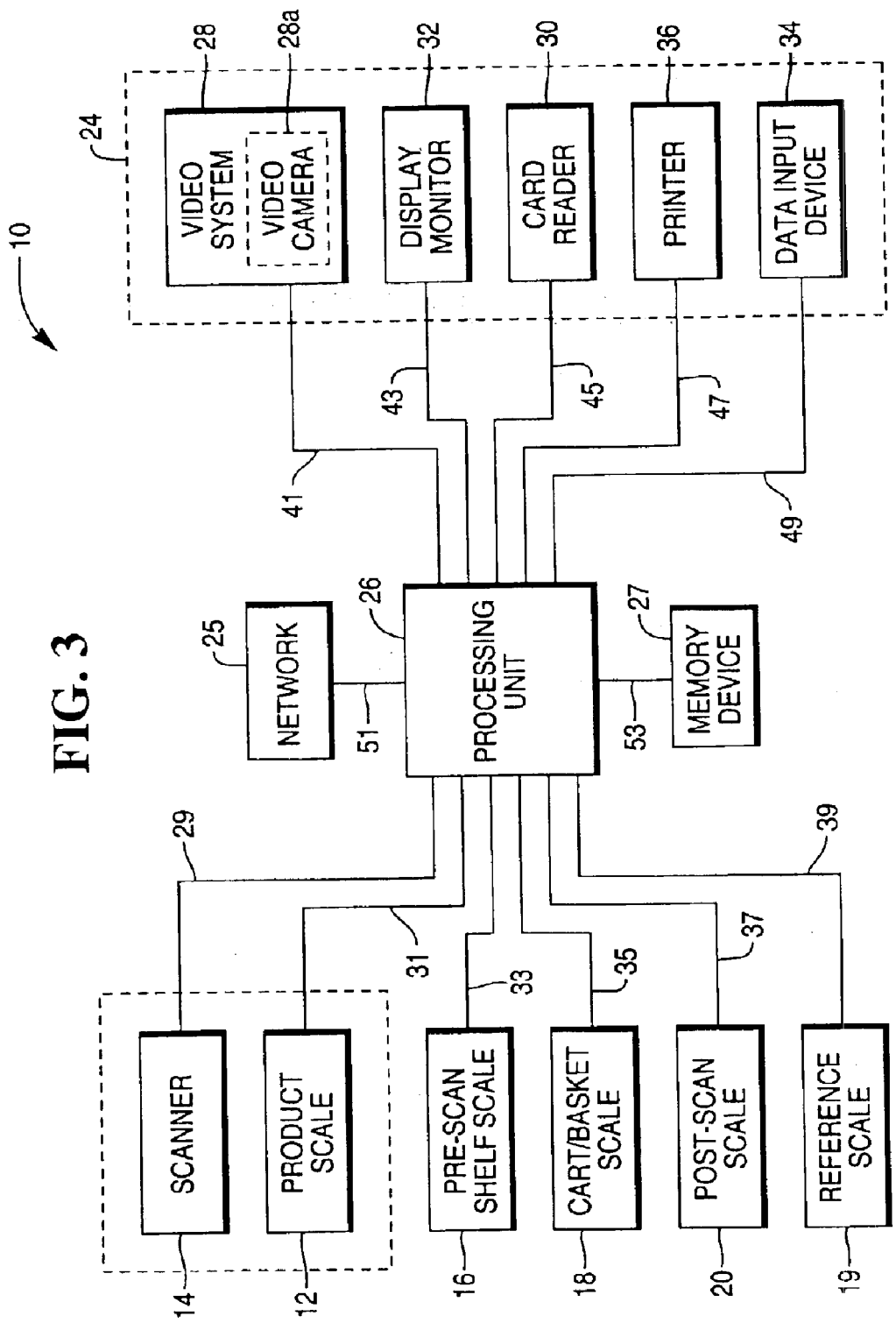
FIG. 3 is a simplified block diagram of the self-service checkout terminal of FIG. 1.

Referring now to FIG. 3, there is shown a simplified block diagram of the self-service checkout terminal 10. The processing unit 26 is electrically coupled to the product scale 12, the scanner 14, the pre-scan shelf scale 16 (if so equipped), the cart/basket scale 18 (if so equipped), the reference scale 19, the post-scan scale 20, the video system 28, the card reader 30, the display monitor 32, the data input device 34, and the printer 36. The processing unit 26 is also electrically coupled to a network 25 and a memory device 27 as shown in FIG. 3.

The processing unit 26 monitors output signals generated by the scanner 14 via a communication line 29. In particular, when the user of the self-service checkout terminal 10 scans an item which includes a bar code across the scanning windows 14a, 14b, an output signal is generated on the communication line 29.

The processing unit 26 is coupled to the product scale 12 via a data communication line 31. In particular, when an item is placed on the product scale 12, the product scale 12 generates an output signal on the data communication line 31 indicative of the weight of the item.

If the self-service checkout terminal 10 is equipped with the pre-scan shelf 16, the processing unit 26 communicates with the pre-scan shelf scale 16 via a data communication line 33. In particular, when an item is placed on the pre-scan shelf 42a, the pre-scan shelf scale 16 generates an output signal on the data communication line 33 indicative of the weight of the item. Similarly, when an item is removed from the pre-scan shelf 42a, the pre-scan shelf scale 16 generates an output signal on the data communication line 33 indicative of the weight of the removed item.

Similarly, if the self-service checkout terminal 10 is equipped with the cart/basket scale 18, the processing unit 26 communicates with the cart/basket scale 18 via a data communication line 35. In particular, when an item is removed from either the grocery cart 21 or the grocery hand basket 23, the cart/basket scale 18 generates an output signal on the data communication line 35 indicative of the weight of the removed item.

The processing unit 26 is coupled to the reference scale 19 via a data communication line 39. In particular, the reference scale 19 preferably continuously generates an output signal on the data communication line 39 indicative of the weight of the mass 55. However, it is also possible for the output signal to be intermittently generated by the reference scale 19. The output signal of the reference scale 19, like the output signals of the product scale 12, the pre-scan shelf scale 16, the cart/basket scale 18 and the post-scan scale 20, includes a noise signal indicative of the environmental vibrations to which the cabinet 25 is subjected.

The processing unit 26 is coupled to the post-scan scale 20 via a data communication line 37. In particular, when an item is placed on the post-scan shelf 42b or into one of the grocery bags 40, the post-scan scale 20 generates an output signal on the data communication line 37 indicative of the weight of the item. Similarly, when an item is removed from the post-scan shelf 42b or one of the grocery bags 40, the post-scan scale 20 generates an output signal on the data communication line 37 indicative of the weight of the removed item. As discussed above, such output signals from the post-scan scale 20 have their noise signal components subtracted out by the difference circuit 59 of the processing unit 26 prior to being utilized by the security software application 22 (see FIG. 4).

The processing unit 26 communicates with the video system 28 via a communication line 41. The video system 28 includes a video camera 28a (see also FIG. 1), and is included in the self-service checkout terminal 10 to enhance the security thereof. The video system 28 may be a known closed-circuit video system which displays video images on a portion of the display monitor 32 relating to certain events during a user's transaction.

The processing unit 26 communicates with the display monitor 32 through a data communication line 43. The processing unit 26 generates output signals on the data communication line 43 which cause various instructional messages to be displayed on the display monitor 32. The display monitor 32 may include known touch screen technology which can generate output signals when the user touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, the instructional messages may be generated with a voice generating device (not shown) or an audible tone generating device (not shown).

The data input device 34 is coupled to the processing unit 26 through a data communication line 49. The data input device 34 may include one or more of a known keypad or a touch pad. In addition, the processing unit 26 is coupled to the printer 36 via a data communication line 47. The printer 36 may be used to print a receipt at the end of a given checkout procedure. Moreover, the card reader 30 is coupled to the processing unit through a data communication line 45. The card reader 30 may include a known credit and/or debit card reader, or a smart card reader.

The processing unit 26 includes network interface circuitry (not shown) which conventionally permits the self-service checkout terminal 10 to communicate with the network 25 such as a LAN or WAN through a wired connection 51. The processing unit 26 communicates with the network 25 during the checkout procedure in order to obtain information such as pricing information on an item being scanned or weighed, and also to verify user credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the network 25.

The processing unit 26 communicates with the memory device 27 via a data communication line 53. The memory device 27 is provided to maintain an electronic transaction table which includes a record of the product information associated with each item that is scanned, weighed, or otherwise entered during the user's use of the self-service checkout terminal 10. For example, if the user scans a can of soup, the description of the soup and the pricing information associated therewith is recorded in the transaction table in the memory device 27. Similarly, if the user weighs a watermelon with the product scale 12 and then enters a product lookup code associated with watermelon via the data input device 34, product information associated with the watermelon is recorded in the transaction table. Moreover, if a user entered a coupon or voucher, the information associated therewith would also be recorded in the transaction table.

It should therefore be appreciated that the sum of each of the items recorded in the transaction table (1) minus any reductions (e.g. coupons), and (2) plus any applicable taxes is the amount that the user pays for his or her transaction. Moreover, data stored in the transaction table is printed out on the printer 36 thereby generating a receipt for the user at the end of his or her transaction.

Further, the memory device 27 stores a predetermined value of the weight of the mass 55 as measured by the reference scale 19 in the absence of vibration. This measured weight of the mass 55 is determined empirically and stored in the memory device 27 so that it may be later subtracted from the output signal of the reference scale 19 in order to isolate the noise signal component of the output signal of the reference scale 19.

The memory device 27 is also provided to maintain a number of stored weight values associated with execution of the security software application 22. For example, during execution of the security software application 22, it is necessary to store a previous-stable-weight value in the memory device 27. In particular, in order to detect when items have been placed into or removed from the post-scan area 17, the processing unit 26 determines if the measured (and noise-removed) weight value detected by the post-scan scale 20 increases (in the case of item placement into the post-scan area 17) or decreases (in the case of item removal from the post-scan area 17). In order to determine such an increase or decrease, the processing unit 26 must have a baseline weight value to detect changes therefrom. Such a baseline weight value, herein referred to as a "previous-stable-weight value", is indicative of the last detected weight value by the post-scan scale 20 that has had its noise component removed. Hence, if the current weight value detected by the post-scan scale 20 is greater than the previous-stable-weight value (after having had its noise component removed by the difference circuit 59), the processing unit 26 concludes that an item (or items) has been placed in the post-scan area 17. Conversely, if the current weight value detected by the post-scan scale 20 is less than the previous-stable-weight value (after having had its noise component removed by the difference circuit 59), the processing unit 26 concludes that an item (or items) has been removed from the post-scan area 17.

The memory device 27 also stores other program instructions for general operation of the retail checkout terminal 10. The memory device 27 has been shown herein as being disposed within the retail checkout terminal 10. However, it is to be understood that the memory device 27 and/or any of its stored tables, program instructions, weight values, etc., may be remotely stored and accessible by the retail checkout terminal 10.

In operation, during a user's checkout transaction, the processing unit 26 monitors the output signal from the post-scan scale 20 representing the measured weight of the item(s) on the post-scan scale 20. The processing unit 26 also monitors the output signal from the reference scale 19 representing the measured weight of the mass 55 on the reference scale 19. The noise cancellation routine 73 includes the difference circuits 59 and 61 which may be implemented in software in the processing circuit 26.

The difference circuit 61 receives both the output signal from the reference scale 19 and the stored weight of the mass 55 from the memory device 27. The difference circuit 61 removes the component representing the weight of the mass 55 from the output signal from reference scale 19, thereby outputting the noise component of the output signal from the reference scale 19. This noise component from the reference scale 19 is indicative of the noise component of the output signal from the post-scan scale 20.

The normalizing routine 63 receives the noise component and multiplies it by a gain factor (G) in order to match the noise component of the output signal from the post-scan scale 20. Thus, the normalized noise component from the routine 63 is a proxy for the noise signal component in the output signal from the post-scan scale 20.

The difference circuit 59 receives the normalized noise component from the routine 63 and subtracts it from the output signal from the post-scan scale 20. That is, the processing unit 26 modifies the output signal from the post-scan scale 20 dependent upon the noise signal component of the output signal of the reference scale 19. The resulting output from the difference circuit 59 represents the weight of the item(s) on the post-scan scale 20 in the absence of environmental vibration. This output from the difference circuit 59 is used by the security software 22 as the best representation of the weight of the item(s) on the post-scan scale 20.

Figure 5:
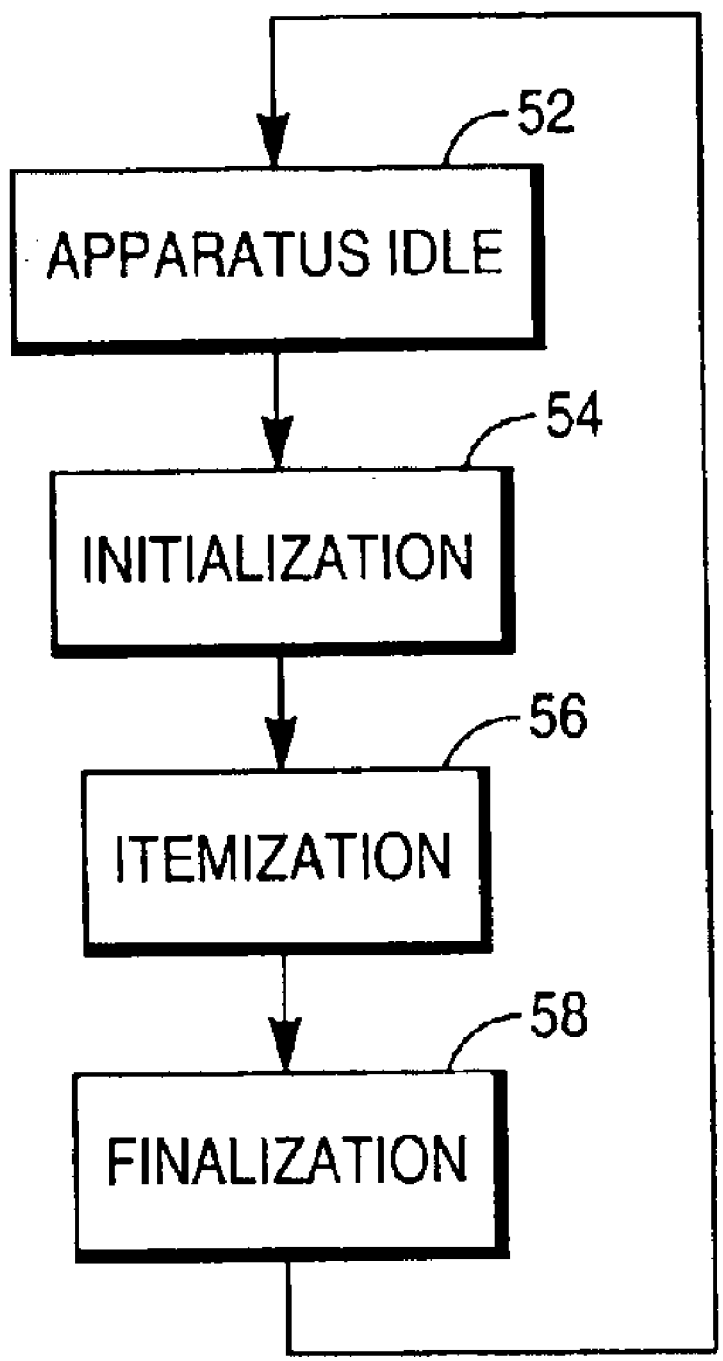
FIG. 5 is a flowchart which sets forth an exemplary general procedure for checking out items for purchase with the self-service checkout terminal of FIG. 1.

Referring now to FIG. 5, there is shown a flowchart which sets forth a general procedure 50 for checking out items through the self-service checkout terminal 10. When a user arrives at the self-service checkout terminal 10, the self-service checkout terminal 10 is in an idle state (step 52). An initialization step 54 is executed prior to checking out items for purchase. In particular, one or more initialization instructions are displayed on the display monitor 32 which instruct the user to (1) touch a particular area of the display monitor 32 or push a particular button on the data input device 34 in order to select a desired method of payment, and/or (2) identify himself or herself by inserting a shopping card, debit card, credit card, or smart card into the card reader 30.

At the completion of the initialization step 54, the routine 50 advances to an itemization step 56 where the user enters individual items for purchase by scanning the items across the scanner 14. Moreover, in step 56 the user enters items, such as produce items or the like, by weighing the items with the product scale 12, and thereafter entering a product lookup code associated with the item via either the data input device 34 or by touching a particular area of the display monitor 32. Further, in step 56 the user may enter an item by manually entering the product code associated with the item via use of the data input device 34. Such manual entry of an item may be necessary for items which would otherwise be entered via the scanner 14 if the bar code printed on the item is not readable by the scanner 14. It may also be necessary during step 56 for the user to void entry of an item from the checkout procedure via use of the scanner 14 or the data input device 34. It should be appreciated that during the itemization step 56, items are typically placed in and removed from the post-scan area 17 of the self-service checkout terminal 10. Hence, during the itemization step 56, the processing unit 26 removes the noise signal component from the output signal of the post-scan scale 20 in order to provide valid, stable weights for presentation to the security software application 22.

Moreover, it should be appreciated that the self-service checkout terminal 10 may be configured such that the routine 50 allows experienced users of the self-service checkout terminal 10 to bypass the initialization step 52 thereby advancing directly to the itemization step 56. In such a configuration, the experienced user would begin the transaction by scanning or otherwise entering his or her first item for purchase.

At the completion of the itemization step 56, the routine 50 advances to a finalization step 58 in which (1) a grocery receipt is printed by the printer 36, and (2) payment is tendered by either inserting currency into a cash acceptor (not shown), charging a credit card account, or decreasing a value amount stored on a smart card or debit card via the card reader 30. It should be appreciated that in the case of when a user inserts currency into the cash acceptor, the self-service checkout terminal 10 may provide change via a currency dispenser (not shown) and a coin dispenser (not shown). After completion of the finalization step 58, the routine 50 returns to step 52 in which the self-service checkout terminal 10 remains in the idle condition until a subsequent user initiates a checkout procedure.

Figure 6:
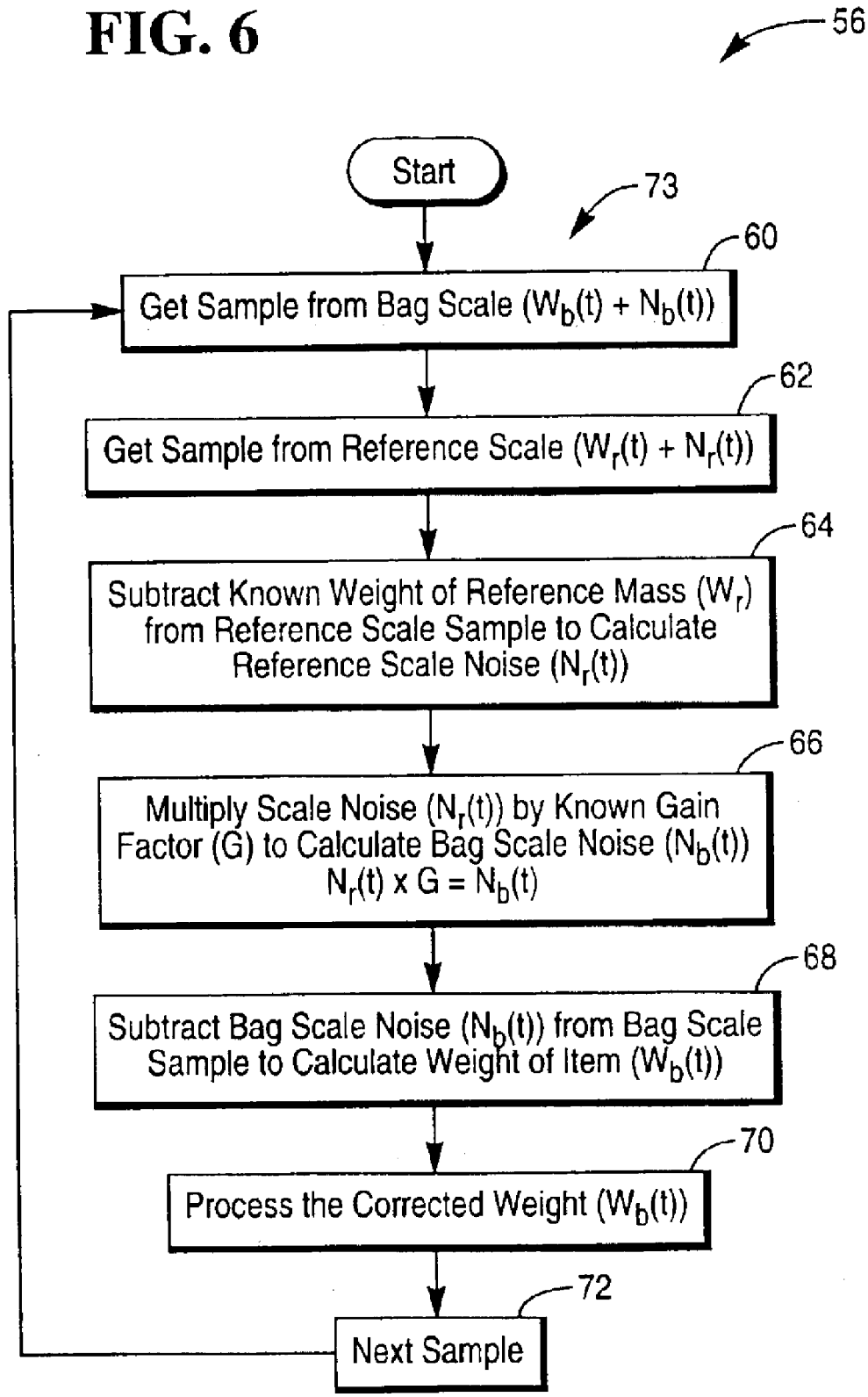
FIG. 6 is a flowchart which sets forth a portion of the itemization step of the general procedure of FIG. 5 in greater detail.

Referring now to FIG. 6, there is shown a flowchart setting forth an exemplary manner of operation of the itemization step 56 in greater detail. As alluded to above, the processing unit 26 removes the noise signal component ($N_b(t)$) from the output signal ($W_b(t)+N_b(t)$) of the post-scan bag scale 20 during the itemization step 56 in order to monitor placement of items in and removal of items from the post-scan area 17. The noise cancellation routine 73 begins with step 60 in which the processing unit 26 determines the measured weight values being output from the post-scan scale 20. In particular, the processing unit 26 monitors the data communication line 37 in order to receive the measured weight values ($W_b(t)+N_b(t)$) being output from the post-scan scale 20.

In step 62, the processing unit 26 determines the measured weight values being output from the reference scale 19. In particular, the processing unit 26 monitors the data communication line 39 in order to receive the measured weight values ($W_r(t)+N_r(t)$) being output from the reference scale 19.

In step 64, the processing unit 26 subtracts the known, predetermined and constant weight of the mass 55 from the measured weight values from the reference scale 19. In particular, the difference circuit 61 subtracts the weight of the mass 55 ($W_r$) from the measured weight values ($W_r(t)+N_r(t)$). The weight signal component $W_r(t)$ does not vary with time since the weight of the mass 55 is constant. Thus, the output of the difference circuit 61 is the noise signal component ($N_r(t)$) of the measured weight values ($W_r(t)+N_r(t)$) being output from the reference scale 19.

In step 66, the normalizing routine 63 of the processing unit 26 adjusts the "gain" or the "range" of the reference noise signal component ($N_r(t)$) to match the bag scale noise signal component ($N_b(t)$). More particularly, the normalizing routine 63 multiplies the reference noise signal component ($N_r(t)$) by a known, constant and empirically-determined gain factor (G) to thereby provide a calculated estimate of the bag scale noise signal component ($N_b(t)$). The output characteristics of the respective load cells within the post-scan scale 20 and the reference scale 19 are likely to differ. That is, assuming that the load cells are measuring an equal mass, one load cell will produce a higher voltage than the other load cell due to manufacturing variations. In order to calibrate the load cells so that their outputs are proportionate, a gain factor (G) is empirically determined between the outputs of the load cells. For example, if it is empirically-determined that the load cell of the post-scan scale 20 outputs 1.2 volts when weighing a given mass in the absence of vibration, and that the load cell of the reference scale 19 outputs 1.0 volt when weighing the same given mass in the absence of vibration, then the gain factor (G) between the outputs of the load cells is determined to be 1.2.

It is assumed herein that the outputs of the load cells vary linearly with the mass of the objects being weighed. If the load cells are not in fact linear, it is within the scope of the present invention to use empirically-determined gain factors which vary with the magnitude of the reference noise signal component ($N_r(t)$).

In step 68, the difference circuit 59 of the processing unit 26 subtracts the noise signal component ($N_b(t)$) of the post-scan scale 20, which was calculated in step 66, from the output signal of the post-scan scale 20. The output of the difference circuit 59 is the true weight of the item or items being weighed on the post-scan scale 20 with the effects of environmental vibration having been removed. Of course, the weight of any tray on the post-scan scale 20 may have been included in the output signal of the post-scan scale 20, and the processing unit 26 may have to subtract this known weight from the output of the difference circuit 59 in order to determine the weight of the item(s) being weighed by the post-scan scale 20.

In step 70, the corrected weight value $W_b(t)$ output by the difference circuit 59 is transmitted to the security software application 22 for processing. In step 72, the routine 73 then loops back to step 60 to monitor additional measured weight values.

A numerical example is now provided in order to clarify the operation of the noise cancellation routine 73. Assume that the known weight of the mass 55 is 1 lb. and that the gain factor (G) between the reference scale 19 and the post-scan scale 20 is 1.2. Also assume that, at time t=1, the post-scan scale 20 transmits an output signal having a value of 2.5 lb. (step 60). Further assume that, at time t=1, the reference scale 19 transmits an output signal having a value of 1.1 lb. (step 62). The difference circuit 61 subtracts the known weight of 1.0 lb. from the measured weight of 1.1 lb. to thereby calculate a reference noise signal component of 0.1 lb. (step 64). The normalizing routine 63 then multiplies the reference noise signal component of 0.1 lb. by the gain factor of 1.2 to thereby estimate the bag scale noise signal component to be 0.12 lb. (step 66). The difference circuit 59 subtracts the bag scale noise signal component of 0.12 lb. from the measured weight of the post-scan scale 20 of 2.5 lb. to thereby calculate a corrected, noise-removed weight of 2.38 lb. for the item(s) being weighed on the post-scan bag scale 20 (step 68). This corrected weight of 2.38 lb. is then transmitted to the security software application 22 for processing (step 70).

Figure 7A:
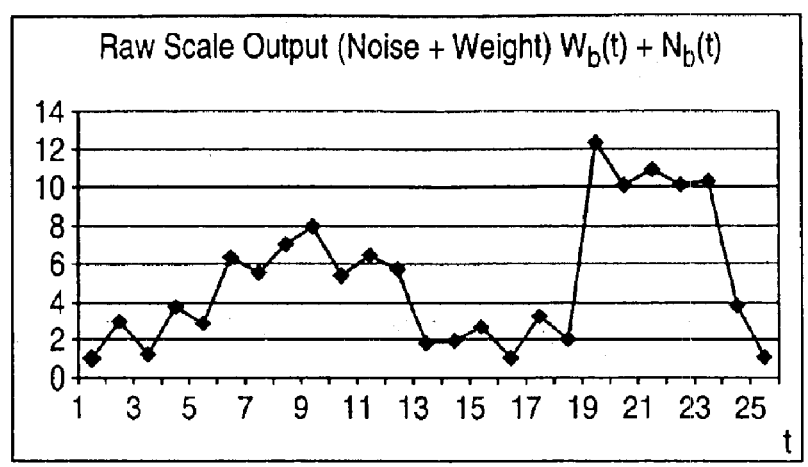
FIG. 7a is a representative plot of an output signal from the post-scan scale of FIG. 4.
Figure 7B:
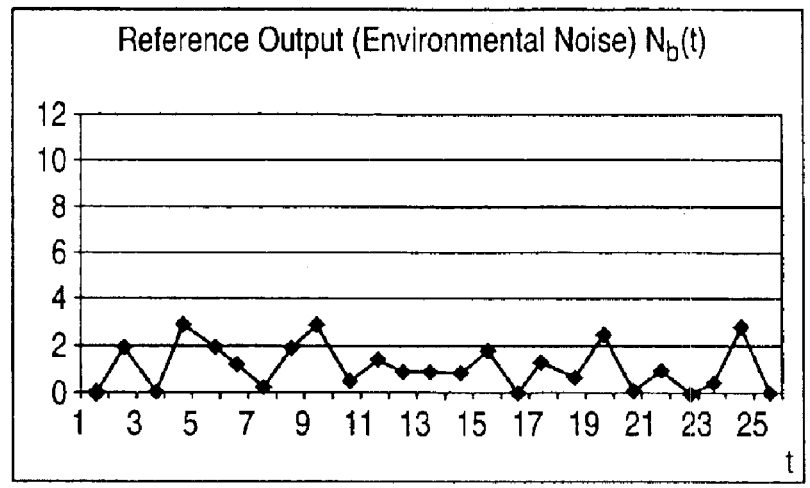
FIG. 7b is a representative plot of a normalized noise signal $N_b(t)$ output by the normalizing routine of FIG. 4.
Figure 7C:
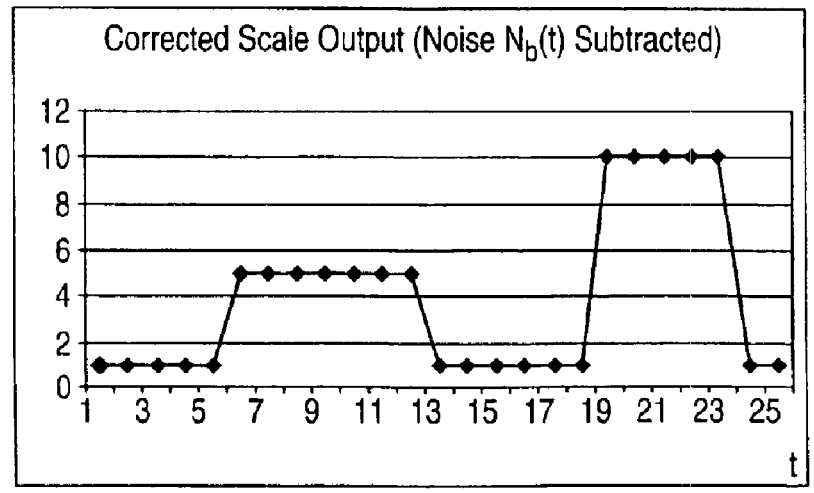
FIG. 7c is a representative plot of an input signal to the security software application of FIG. 4.

FIG. 7a is a representative plot of an output signal from the post-scan scale 20, including both the weight signal component $W_b(t)$ and the noise signal component $N_b(t)$. FIG. 7b is a representative plot of a normalized noise signal $N_b(t)$ output by the normalizing routine 63. FIGS. 7a and 7b span the same periods of time. FIG. 7c is a representative plot of an output of the difference circuit 59. That is, FIG. 7c is a plot of the output signal of FIG. 7a from the post-scan scale 20 minus the normalized noise signal $N_b(t)$ of FIG. 7b output by the normalizing routine 63. The signal plotted in FIG. 7c is indicative of the weights of items placed on the post-scan scale 20 with the noise resulting from vibration having been cancelled out.

Figure 8:
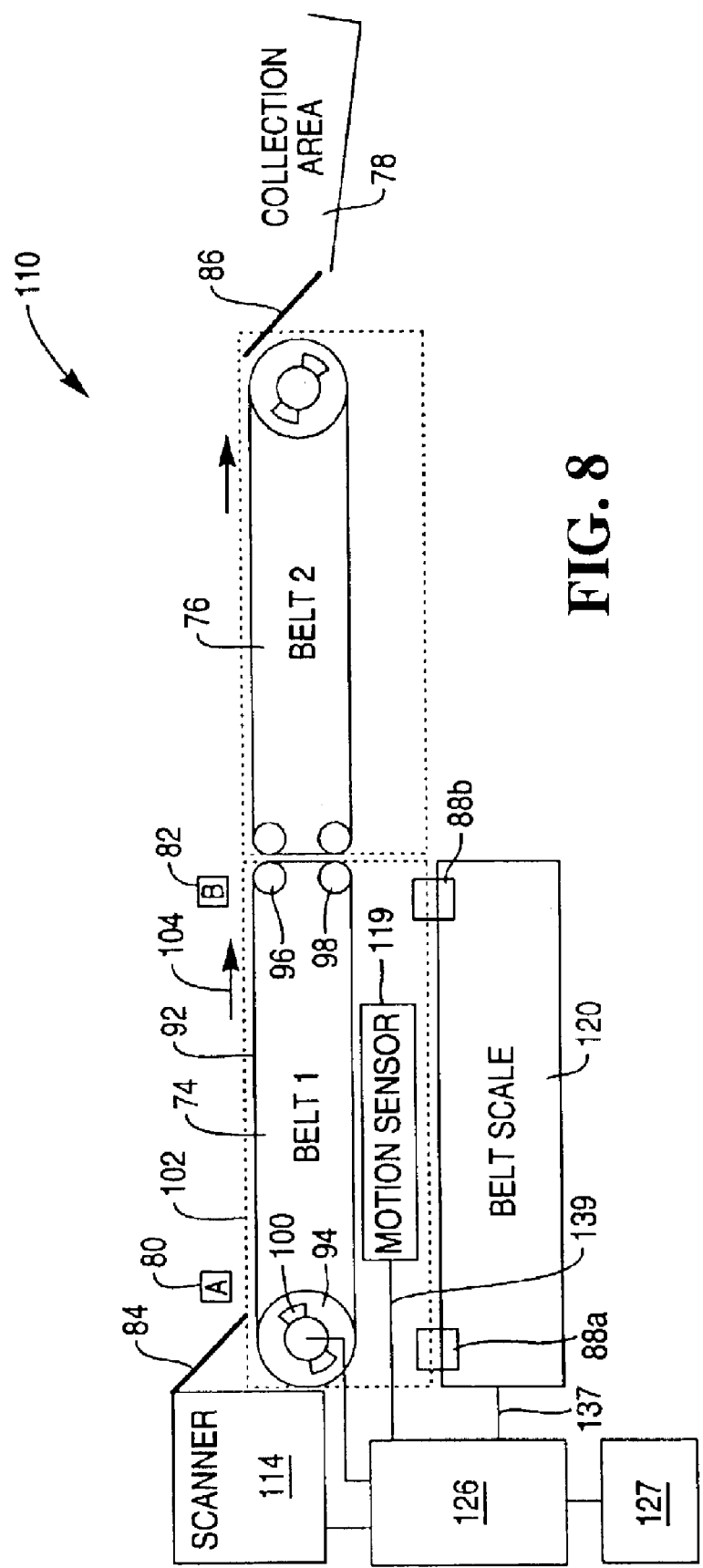
FIG. 8 is a schematic view of another embodiment of the self-service checkout terminal of the present invention.

Referring now to FIG. 8, there is shown another exemplary embodiment of a self-service retail checkout terminal 110 of the present invention. The self-service retail checkout terminal 110 includes a first takeaway belt assembly 74, a second takeaway belt assembly 76, a collection area 78, a first item sensor 80, a second item sensor 82, a first transition plate 84, a second transition plate 86, damping elements 88a, 88b, a scanner 114, a belt scale 120, a processing unit 126, and a memory device 127.

The first takeaway belt assembly 74 includes a takeaway belt 92 carried by a driven roll 94 and idler rolls 96, 98. The driven roll 94 is driven by a motor 100. The rolls 94, 96, 98 are rigidly mounted to a frame 102. The first takeaway belt assembly 74 also includes a motion sensor 119, which is also rigidly mounted to the frame 102. The motion sensor 119 can be an accelerometer or like device that provides relative measurements of low frequency vibration. That is, the motion sensor 119 can be a vibration-measuring device or noise-measuring device. The accelerometer can be a three-axis accelerometer that allows forces in three axes to be independently measured and weighted as to their effects on the belt scale 120. Mounting the motion sensor 119 to the first takeaway belt assembly 74 rather than to the belt scale 120 has the advantage of providing motor vibration measurements having a better signal-to-noise ratio (wherein the "signal" is vibrational noise from the motor and other environmental sources) because the effects of the damping components 88a, 88b are eliminated.

The belt scale 120 fully supports the first takeaway belt assembly 74. The belt scale 120 is connected to the frame 102 via damping elements 88a, 88b, which may be formed of rubber. Although only two damping elements 88a, 88b are shown in FIG. 8 in order to simplify the drawing, it is to be understood that any number of such damping elements may be used to connect the belt scale 120 to the frame 102. The belt scale 120 is configured to measure the weight of any items placed upon the belt 92. In particular, if a user places an item on the belt 92, the belt scale 120 may be used to determine the weight of the item by detecting a weight increase associated with placement of the item on the belt 92. Alternatively, if a user removes an item from the belt 92, the belt scale 120 may be used to determine the weight of the item by detecting a weight decrease associated with removal of the item from the belt 92.

The processing unit 126 is electrically connected to the scanner 114, the motor 100, the motion sensor 119, the belt scale 120, and the memory device 127. The processing unit 126 may also be connected to a product scale, a network, and other components of a checkout terminal, similarly to the processing unit 26 of the first embodiment described herein.

In operation, during a checkout transaction, the user places scanned items onto the first takeaway belt 92. Before or simultaneously with the scanning of the first item, the motor 100 drives the belt 92 to rotate in the direction indicated by arrow 104. At the downstream end of the first takeaway belt assembly 74, the items are transferred onto the second takeaway belt assembly 76, from which the items are further passed on to the collection area 78. The angled transition plates 84, 86 are positioned so as to prevent the items from falling inside the cabinetry at the upstream end of the first takeaway belt assembly 74 and the downstream end of the second takeaway belt assembly 76, respectively.

The processing unit 126 monitors the output signal from the belt scale 120 representing the measured weight of the item(s) on the belt scale 120. The accuracy of the output signal from the belt scale 120 is hampered by the vibration noise interference introduced by the motor 100 in combination with the remainder of the first takeaway belt assembly 74. Other sources of vibration noise interference in the output signal from the belt scale 120 include environmental noise introduced through the system cabinet, such as by the cabinet being bumped, or through the belt 92, such as by air movement. Yet another source of environmental noise that interferes with the output signal from the belt scale 120 is the noise created by an item being dropped or pressed onto the belt 92 with a force in excess of the item's gravitational force.

The damping elements 88a, 88b serve to reduce the vibration noise passed on to and measured by the belt scale 120. However, the damping elements 88a, 88b are not completely effective in eliminating the noise that is passed on to the belt scale 120.

Figure 9:
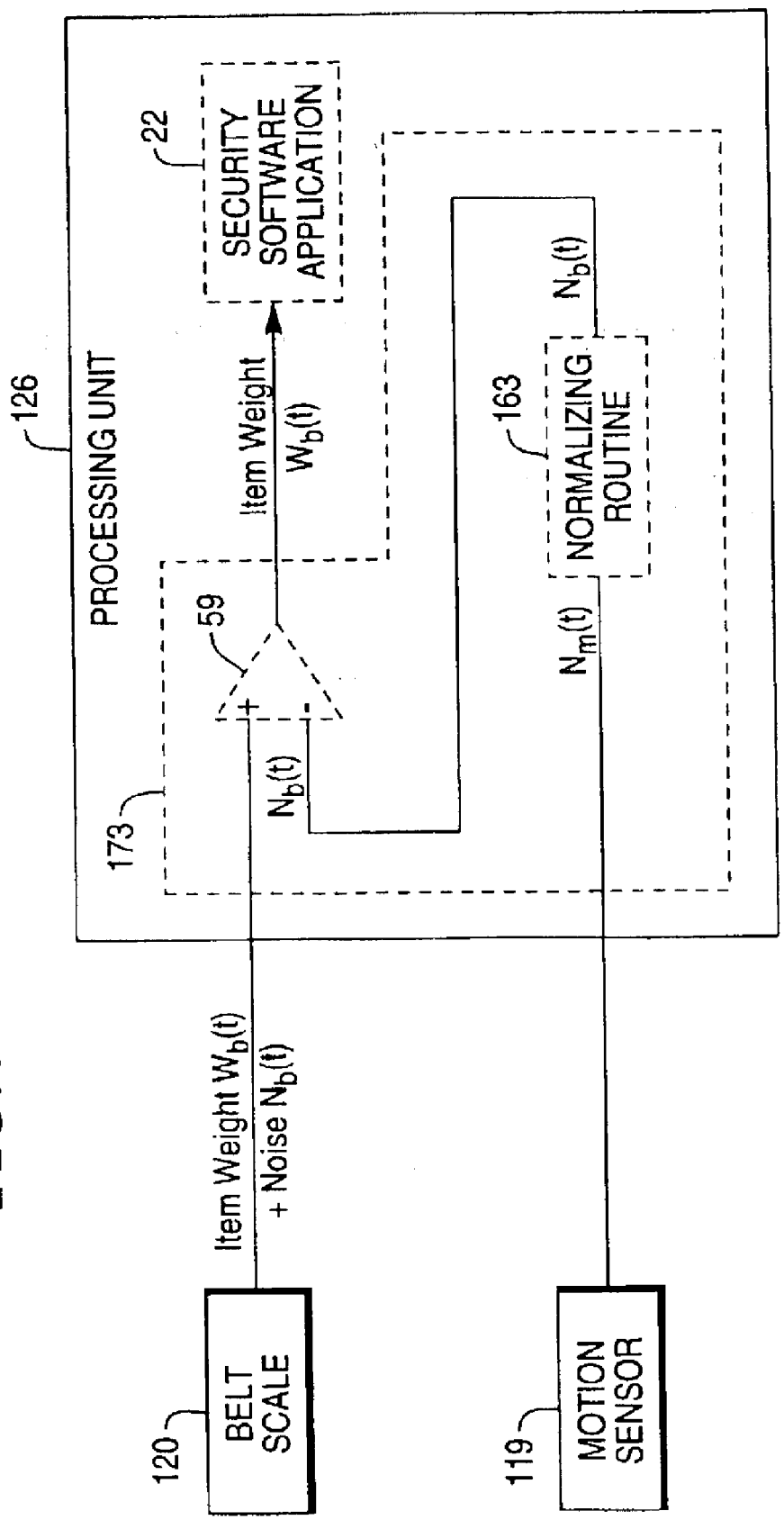
FIG. 9 is a simplified block diagram which shows a data path for generating valid, stable weights according to the embodiment of FIG. 8.

The processing unit 126 also monitors the output signal from the motion sensor 119 representing the environmental noise that exists in the first takeaway belt assembly 74. The processing unit 126 includes a noise cancellation routine 173 (FIG. 9) having a difference circuit 59 which may be implemented in software. The normalizing routine 163 receives the noise signal from the motion sensor 119 and multiplies it by a gain factor (G) in order to match the noise component of the output signal from the belt scale 120. Thus, the normalized noise component from the routine 163 is a proxy for the noise signal component in the output signal from the belt scale 120.

The difference circuit 59 receives the normalized noise component from the routine 163 and subtracts it from the output signal from the belt scale 120. That is, the processing unit 126 modifies the output signal from the belt scale 120 dependent upon the noise signal from the motion sensor 119. The resulting output from the difference circuit 59 represents the weight of the item(s) on the belt scale 120 in the absence of environmental vibration, such as vibration from the motor 100 and other sources. This output from the difference circuit 59 is used by the security software 22 as the best representation of the weight of the item(s) on the belt 92.

Figure 10:
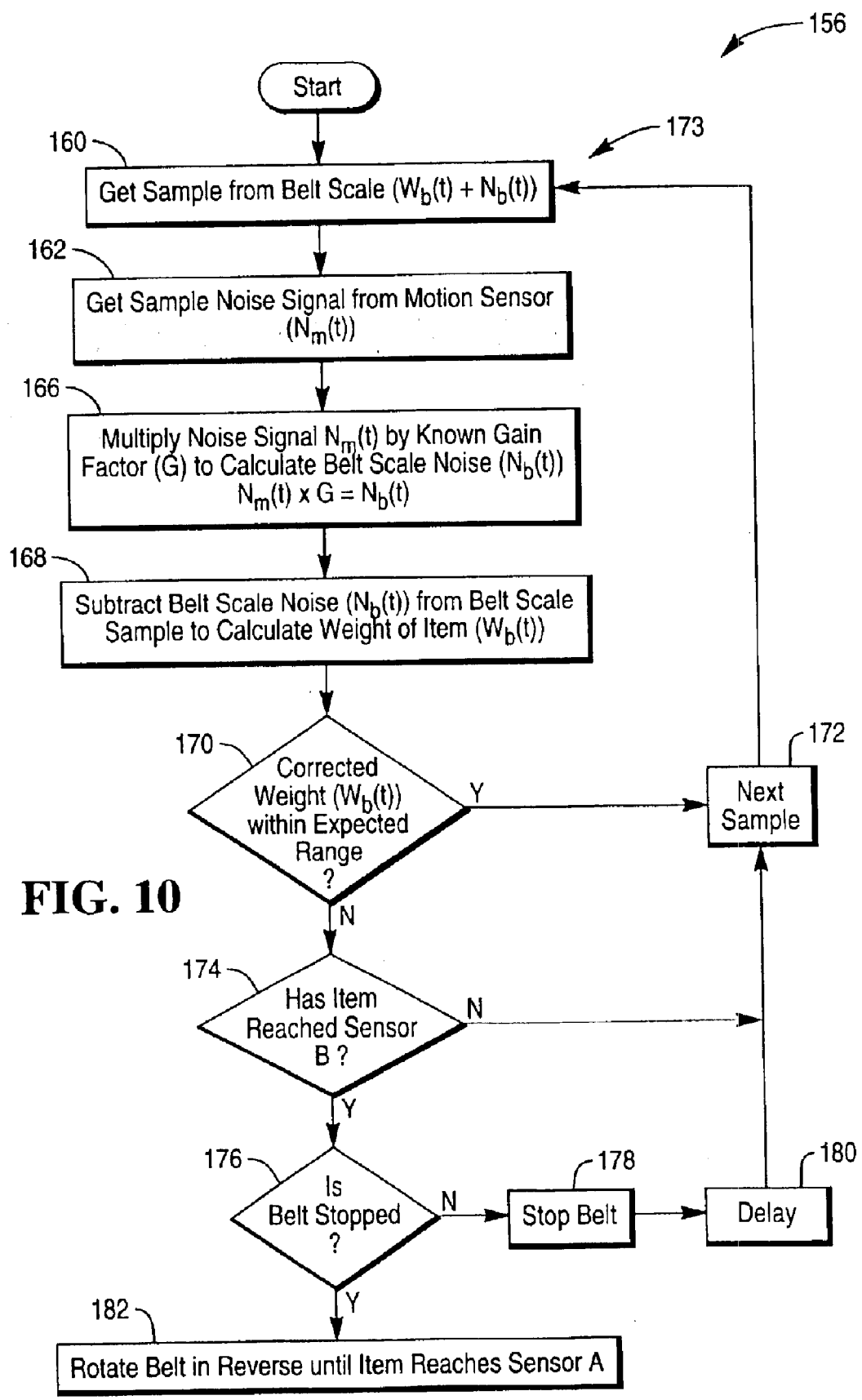
FIG. 10 is a flowchart which sets forth an exemplary general procedure for checking out items for purchase with the self-service checkout terminal of FIG. 8.

Referring now to FIG. 10, there is shown a flowchart setting forth an exemplary manner of operation of an itemization step 156 of a general procedure for checking out items through the self-service checkout terminal 110. As alluded to above, the processing unit 126 removes the noise signal component ($N_b(t)$) from the output signal ($W_b(t)+N_b(t)$) of the belt scale 120 during the itemization step 156 in order to monitor placement of items in and removal of items from the belt 92. The noise cancellation routine 173 begins with step 160 in which the processing unit 126 determines the measured weight values being output from the belt scale 120. In particular, the processing unit 126 monitors a data communication line 137 in order to receive the measured weight values ($W_b(t)+N_b(t)$) being output from the belt scale 120.

In step 162, the processing unit 126 determines the measured weight values being output from the motion sensor 119. In particular, the processing unit 126 monitors the data communication line 139 in order to receive the noise signal values ($N_m(t)$) being output from the motion sensor 119.

In step 166, the normalizing routine 163 of the processing unit 126 adjusts the "gain" or the "range" of the noise signal value ($N_m(t)$) to match the belt scale noise signal component ($N_b(t)$). More particularly, the normalizing routine 163 multiplies the noise signal value ($N_m(t)$) by a known, constant and empirically-determined gain factor (G) to thereby provide a calculated estimate of the belt scale noise signal component ($N_b(t)$). In order to calibrate the motion sensor 119 and the belt scale 120 so that their outputs are proportionate, a gain factor (G) is empirically determined between the outputs of the motion sensor 119 and the belt scale 120. For example, if it is empirically-determined that the belt scale 120 outputs 0.30 volt when subject to a given environmental noise, and that the motion sensor 119 outputs 0.10 volt when subject to the same given environmental noise, then the gain factor (G) between the outputs of the motion sensor 119 and the belt scale 120 is determined to be 3.0.

It is assumed herein that the outputs of the motion sensor 119 and the belt scale 120 vary linearly with the magnitude of the environmental noise to which they are subjected. If one or both of their outputs are not in fact linear, it is within the scope of the present invention to use empirically-determined gain factors which vary with the magnitude of the noise signal value ($N_m(t)$).

In step 168, the difference circuit 59 of the processing unit 126 subtracts the noise signal component ($N_b(t)$) of the belt scale 120, which was calculated in step 166, from the output signal of the belt scale 120. The output of the difference circuit 59 is the true weight of the item or items being weighed on the belt scale 120 with the effects of environmental vibration having been removed. Of course, the weight of the first takeaway belt assembly 74 on the belt scale 120 may have been included in the output signal of the belt scale 120, and the processing unit 126 may have to subtract this known weight from the output of the difference circuit 59 in order to determine the weight of the item(s) being weighed by the belt scale 120.

The corrected weight value $W_b(t)$ output by the difference circuit 59 is transmitted to the security software application 22 for processing. More particularly, in step 170, the security software application 22 determines whether the corrected weight value $W_b(t)$ is within the expected range for the item(s) scanned by the scanner 114. The security software application 22 may include a lookup table that specifies an expected weight for each corresponding item identification number or code scanned by the scanner 114. If the corrected weight value $W_b(t)$ is within the expected range for the item(s) scanned by the scanner 114, then, in step 172, the routine 173 loops back to step 160 to monitor additional measured weight values. The items on the belt 92 are carried in direction 104, transferred to the second takeaway belt assembly 76, and are deposited in the collection area 78 where they rest until being bagged by the user after completion of the itemization and tender processes.

If, however, the corrected weight value $W_b(t)$ is not within the expected range for the item(s) scanned by the scanner 114, then, in step 174, it is determined whether the last item placed on the belt 92 has reached the downstream end of the belt 92. Specifically, the item sensor 82 (sensor B) senses whether the last item placed on the belt 92 has reached a point within the detection range of the sensor 82. The detection range of the sensor 82 is near the downstream end of the belt 92. If the last item placed on the belt 92 has not reached the downstream end of the belt 92, then, in step 172, the routine 173 loops back to step 92. If the last item placed on the belt 92 has not reached the downstream end of the belt 92, then, in step 172, the routine 173 loops back to step 160 to monitor additional measured weight values. It is possible for the corrected weight value $W_b(t)$ of the item(s) on the belt 92 to change to a value within its expected range due to attenuation of vibration as the item(s) proceed downstream on the belt 92. For example, sloshing of the contents of an item may subside with time, thereby allowing the associated vibration to dissipate.

If, however, the last item placed on the belt 92 does reach the downstream end of the belt 92 without the corrected weight value $W_b(t)$ of the item(s) on the belt 92 changing to a value within its expected range, then it is determined, in step 176, whether the belt 92 has been stopped or whether the belt 92 is still rotating. If the belt 92 is not stopped, then the belt 92 is stopped in step 178. A short time delay is provided (step 180) in order to allow the contents of the items of the belt 92 to stabilize and the vibration noise to attenuate and dissipate. Then, in step 172, the routine 173 loops back to step 160 to again monitor the measured weight values and determine whether the corrected weight value $W_b(t)$ of the item(s) on the belt 92 is now within its expected range. If so, the belt 92 restarts its rotation and the user can continue to scan items and place them on the belt 92.

If, however, the belt 92 is found to be in its stopped condition in step 176 without the corrected weight value $W_b(t)$ of the item(s) on the item placed on the belt 92 has reached the upstream end of the belt 92. Specifically, the item sensor 80 (sensor A) senses whether the last item placed on the belt 92 has reached a point within the detection range of the sensor 80. The detection range of the sensor 80 is near the upstream end of the belt 92. Upon the last-placed item reaching the sensor 80, or upon the expiration of a predetermined time period, the belt 92 is stopped and the user is prompted to take corrective action, such as removing the last-placed item from the belt 92 and rescanning it. The prompt provided to the user may be in the form of a message on a display screen, an audio message, or a store employee who has been summoned by the terminal 110.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, the outputs from the product scale 12, the pre-scan shelf scale 16 and the cart/basket scale 18 may have their noise signal components removed in a similar manner as the output from the post-scan scale 20 to fit the needs of a particular self-service checkout terminal 10.

The noise cancellation method of the present invention substantially improves the ability of the self-checkout terminal to detect a stable weight in a minimum amount of time. This ability allows faster security detection of incorrect weight conditions, as well as faster detection of correct weight conditions. Faster determination of correct weight conditions allows the processing unit to allow the next item to be scanned sooner, thereby improving the overall performance of the self-checkout terminal.

It is to be understood that the present invention can be applied in combination with numeric processing techniques such as averaging. Moreover, it is also to be understood the present invention can be used to separate and cancel noise that is produced either internally, i.e., within a checkout terminal, or externally, i.e., outside of a checkout terminal.

What is claimed is:

1. A method of operating a retail terminal having a first weight scale associated therewith, said method comprising the steps of:

using said first weight scale to produce a first output signal, said first output signal including a first weight signal and a first noise signal;

creating a second noise signal indicative of said first noise signal; and removing said first noise signal from said first output signal with dependence upon said second noise signal.

2. The method of claim 1, further comprising the step of providing said retail terminal with a second weight scale, said creating step including using said second weight scale to produce a second output signal, said second output signal including a second weight signal and said second noise signal.

3. The method of claim 2, wherein said second weight signal is associated with a mass having a fixed weight such that said second weight signal is substantially constant.

4. The method of claim 3, comprising the further step of providing a cabinet supporting each of said first weight scale and said second weight scale, each of said first weight scale and said second weight scale being attached to said cabinet such that substantially all environmental vibrations transmitted to said first weight scale through said cabinet are also transmitted to said second weight scale.

5. The method of claim 4, wherein each of the first noise signal and the second noise signal is indicative of the environmental vibrations.

6. The method of claim 2, comprising the further step of adjusting a gain of said second noise signal to produce a normalized second noise signal approximately equal to said first noise signal, said step of removing said first noise signal from said first output signal comprising subtracting said normalized second noise signal from said first output signal.

7. The method of claim 1, further comprising the step of providing said retail terminal with a motion sensor, said creating step including using said motion sensor to produce a second noise signal.

8. The method of claim 1, wherein said retail terminal executes a security software application so as to provide security to said retail terminal during operation thereof, and further comprising the step of:

utilizing said first output signal during execution of said security software application.

9. A retail terminal, comprising:

a first weight scale;

a vibration-measuring device;

a processing unit coupled to each of said first weight scale and said vibration-measuring device; and a memory device coupled to said processing unit for storing a plurality of instructions;

wherein said processing unit executes the instructions in order to:

(a) receive a first output signal from said first weight scale;

(b) receive a noise signal from said vibration-measuring device;

(c) adjust a gain of said noise signal to produce a normalized noise signal indicative of an amount of noise in said first output signal;

(d) modify said first output signal dependent upon said noise signal, including subtracting said normalized noise signal from said first output signal.

10. The retail terminal of claim 9, wherein said plurality of instructions, when executed by said processing unit, further causes said processing unit to:

(a) execute a security software application so as to provide security to said retail terminal during operation thereof, and (b) utilize said first output signal after said modifying step during execution of said security software application.

11. The retail terminal of claim 9, wherein said vibration-measuring device comprises a second weight scale configured for:

weighing a mass having a fixed weight; and producing a second output signal dependent upon said weighing step, said second output signal including a weight signal and said noise signal.

12. The retail terminal of claim 11, further comprising a cabinet supporting each of said first weight scale and said second weight scale, each of said first weight scale and said second weight scale being attached to said cabinet such that substantially all environmental vibrations transmitted to said first weight scale through said cabinet are also transmitted to said second weight scale.

13. The retail terminal 12, wherein the noise signal is indicative of the environmental vibrations.

14. The retail terminal of claim 12, wherein said cabinet has an interior cavity, said second weight scale being disposed within said interior cavity.

15. The retail terminal of claim 11, wherein said first weight scale comprises a first load cell, said second weight scale comprising a second load cell.

16. The retail terminal of claim 9, further comprising a takeaway belt, said first weight scale being associated with said takeaway belt.

17. The retail terminal of claim 9, wherein said vibration-measuring device comprises an accelerometer.

18. A method of operating a retail terminal having a first weight scale associated therewith, comprising the steps of:

weighing an item by using the first weight scale;

wherein said first weight scale is subject to vibrations;

producing a first output signal dependent upon said weighing step, said first output signal including a first weight signal and a first noise signal caused by the vibrations;

providing a second weight scale subject to the vibrations;

weighing a mass having a fixed weight by using the second weight scale;

producing a second output signal dependent upon said weighing of said mass, said second output signal including a second weight signal and a second noise signal;

estimating said first noise signal to be equal to the second noise signal to produce an estimated first noise signal; and subtracting said estimated first noise signal from said first output signal.

19. The method of claim 18, wherein said second weight signal is substantially constant, said method further comprising the step of calculating said second noise signal by subtracting said second weight signal from said second output signal.

20. A method of operating a retail terminal having a plurality of weight-measuring scales associated therewith, said method comprising the steps of:

using said weight-measuring scales to produce a plurality of respective first output signals, each said first output signal including a respective first weight signal and a respective first noise signal;

providing said retail terminal with a reference weight scale;

using said reference weight scale to produce a second output signal, said second output signal including a second weight signal and a second noise signal; and removing each said first noise signal from each said first output signal, said removing step being dependent upon said second noise signal.

21. The method of claim 20, wherein said second weight signal is substantially constant, said method comprising the further step of calculating said second noise signal by subtracting said second weight signal from said second output signal.

22. The method of claim 21, comprising the further step of adjusting a gain of said second noise signal to produce at least one normalized second noise signal approximately equal to each said first noise signal, said step of removing each said first noise signal from each said first output signal comprising subtracting said at least one normalized second noise signal from each said first output signal.

23. A method of operating a retail terminal having a first weight scale associated therewith, wherein said retail terminal executes a security software application so as to provide security to said retail terminal during operation thereof, said method comprising the steps of:

using said first weight scale to produce a first output signal, said first output signal including a first weight signal and a first noise signal;

removing said first noise signal from said first output signal; and utilizing said first output signal during execution of said security software application.

24. A retail terminal, comprising:

a first weight scale for producing a first output signal;

a vibration-measuring device including a second weight scale configured for:
 (a) weighing a mass having a fixed weight; and
 (b) producing a second output signal dependent upon said weighing step, said second output signal including a weight signal and a noise signal; and a processing unit coupled to each of said first weight scale and said vibration-measuring device, said processing unit configured to:
 (a) receive the first output signal from said first weight scale;
 (b) receive the noise signal from said vibration-measuring device; and
 (c) modify said first output signal dependent upon said noise signal.

25. The retail terminal of claim 24, further comprising a cabinet supporting each of said first weight scale and said second weight scale, each of said first weight scale and said second weight scale being attached to said cabinet such that substantially all environmental vibrations transmitted to said first weight scale through said cabinet are also transmitted to said second weight scale.

26. The retail terminal 25, wherein the noise signal is indicative of the environmental vibrations.

27. The retail terminal of claim 26, wherein said cabinet has an interior cavity, said second weight scale being disposed within said interior cavity.

28. A retail terminal, comprising:

a first weight scale;

a takeaway belt, said first weight scale being associated with said takeaway belt;

a vibration-measuring device; and a processing unit coupled to each of said first weight scale and said vibration-measuring device, said processing unit configured to:
 (a) receive a first output signal from said first weight scale;
 (b) receive a noise signal from said vibration-measuring device; and
 (c) modify said first output signal dependent upon said noise signal.

29. A retail terminal, comprising:

a first weight scale;

a vibration-measuring device including an accelerometer; and a processing unit coupled to each of said first weight scale and said vibration-measuring device, said processing unit configured to:
 (a) receive a first output signal from said first weight scale;
 (b) receive a noise signal from said vibration-measuring device; and
 (c) modify said first output signal dependent upon said noise signal.

30. A method of operating a retail terminal having a first weight scale associated therewith, comprising the steps of:

weighing an item by using the first weight scale which is subject to vibrations resulting in a first noise signal;

producing a first output signal dependent upon said weighing step, said first output signal including a first weight signal and the first noise signal;

providing a second weight scale subject to the vibrations resulting in a second noise signal;

weighing a mass having a fixed weight by using the second weight scale;

producing a second output signal dependent upon said weighing of said mass, said second output signal including a second weight signal and the second noise signal;

adjusting a gain of said second noise signal to produce a normalized second noise signal;

setting said first noise signal equal to said normalized second noise signal to produce an estimated first noise signal; and subtracting said estimated first noise signal from said first output signal.

31. A method of operating a retail terminal having a first weight scale subject to vibrations associated therewith, comprising the steps of:

weighing an item by using the first weight scale;

producing a first output signal dependent upon said weighing step, said first output signal including a first weight signal and a first noise signal resulting from said vibrations;

providing a motion sensor subject to the vibrations resulting in said first noise signal;

producing a second noise signal by using said motion sensor;

adjusting a gain of said second noise signal to produce a normalized second noise signal;

setting said first noise signal equal to said normalized second noise signal to produce an estimated first noise signal; and subtracting said estimated first noise signal from said first output signal.

* * * * *